UNITED STATES PATENT OFFICE 2,292,199

MANUFACTURE OF COATED PARTICLES

John D. Carter, Lansdowne, Pa., assignor to Philadelphia Quartz Company, Philadelphia, Pa., a corporation of Pennsylvania No Drawing. Application January 16, 1940, Serial No. 314,184

9 Claims. (Cl. 106—77)

This invention relates to manufacture of coated particles; and it consists in a method of producing siliceous gel coatings on particles of chemical compounds, such as heavy metal and alkaline earth metal salts, oxides and hydroxides, which compounds are reactive with solutions of silicates to produce insoluble gelatinous reaction products; said process comprising contacting such particles with a hydrous, water-soluble silicate in the presence of moisture; the moisture present and other conditions being such that the resulting chemical reaction is retarded, which reaction normally results in the initial formation of a gel coating on said particles followed promptly by the formation of insoluble reaction products; and arresting the said chemical reaction while the particles are still reactive with silicate solutions by rendering the silicate inactive, for example by removal of the silicate from the reaction zone or by drying the mixture, whereby a gel coating is produced on said particles which renders said particles slowly reactive with any reactive materials with which said coated particles may be subsequently contacted. My invention also includes the fluid setting compositions formed by mixing the described gel coated particles with a strong solution of an alkali metal silicate, said compositions having a time of set which is substantially longer than that of similar compositions in which the reactive particles are free from the described gel coating; all as more fully hereinafter set forth and as claimed.

This application is a continuation-in-part of my prior co-pending applications, Ser. Nos. 118,140 and 302,055, filed on December 29, 1936, and October 30, 1939, respectively. In these prior applications I have described and claimed a process of treating anhydrite particles with silicate solutions with the formation thereon of siliceous gel-coatings, as well as the resulting coated particles and setting compositions containing the said coated particles. The present application is directed more broadly to the process of producing similar coatings on solid particles which are reactive with solutions of silicates to produce insoluble gelatinous reaction products, and to compositions of matter comprising the gel-coated particles produced by the said process.

In many chemical reactions it is highly desirable to accurately control the rates of reaction in order that products of a certain type may be produced. In many cases of this type products are formed which are quite worthless in the absence of such control. In the majority of cases it is desired to lower the rates of reaction for the reason that it is possible to exercise more accurate control over slow reactions and to arrest such reactions at any desired point. Many different methods have been used to produce delayed reaction rates between solid particles of various types and liquids with which they may be reactive. One of the most common methods of achieving this result is to coat the solid particles with an inert material of some type which dissolves in the liquid only slowly thereby exposing the reactive particles to the action of the reactant at a predetermined rate. It is also well known, of course, to react solids of various types with reactive materials adapted to form insoluble surface coatings which render the solids less reactive. These prior processes are not applicable, however, in the case of a large number of solid chemical compounds which could be made more useful industrially by rendering them more slowly reactive. Moreover in many cases the inert coatings on the particles are objectionable.

I have found that solid particles of chemical compounds which are reactive with aqueous solutions of alkali metal silicates to form therewith insoluble gelatinous precipitates, can be treated with hydrous, water-soluble silicates (including within this term silicic acid gels) under conditions forming siliceous gel coatings on the particles which serve to produce delayed rates of reaction with reactive materials with which said particles may be subsequently contacted. The solid particles which can be thus treated include heavy metal and alkaline earth metal salts, oxides and hydroxides. In order to produce the desired gel coatings the moisture present in the reaction zone must be controlled in such fashion that the reaction between the solid particles and the hydrous silicate requires an appreciable time interval, thus affording an opportunity to arrest the reaction before its completion and at the point when a siliceous coating of the desired thickness and characteristics is produced on the particles.

Some solids react with silicate solutions of all concentrations rather slowly, whereas other solids, such as calcium chloride, react with most silicate solutions with extreme rapidity. With the slowly reactive solids, it is possible to produce the desired gel coating of this invention without any difficulties and without accurate control of the water content of the silicate solution. But with the quickly reactive solids it is usually necessary to employ silicate solutions within a certain range of concentrations, to quickly separate the solid particles from the silicate solutions, to limit the quantity of silicate present in the reaction zone, to dry the mixtures quickly or to employ silicate solutions of the more siliceous types. Any or all of these various expedients or any combination thereof can be employed simultaneously to produce the desired result.

There are several different ways of conducting the coating operation which are capable of producing the desired results. In the case of moderately reactive particles, such as anhydrite, for example, it is possible to contact the particles with a dilute silicate solution, having a concentration ranging from about 2 to 15 per cent by weight, for example, and then to separate the gel coated particles from the solution after a short time interval. The coated particles can be employed immediately after they have been separated from the coating solution, they can be dried first or the solution can be dried without separation from the particles, preferably by one of the conventional methods of flash evaporation. If stronger solutions of silicate are employed in the coating operation, the coating time must be reduced correspondingly but if the more siliceous silicates are used it is possible to employ silicate solutions of commercial strength provided that the coated particles are dried quickly or separated from the solution. It is possible to employ highly concentrated silicate solutions for coating some solids provided that the quantity of solution is limited in such fashion that only sufficient is present to produce the desired gel coating or provided that any excess solution present is rendered inactive by being separated from the particles quickly or by being dried quickly. It is also possible to employ the silicate in the form of a hydrous solid silicate gel to produce a retarded reaction, if desired. Such gels have a rate of reaction which is sufficiently low to permit the coating of even the most reactive solid particles with the desired gel coating of this invention. The more siliceous the silicate solution the less rapid its reaction with solid particles; hence it is advisable, in the coating of the more quickly reactive solid particles, to employ the more highly siliceous silicates.

Several of the best coating methods which I have developed involve limiting the quantity of silicate in the reaction zone or in contact with the particles to be coated. Thus it is possible to agitate a mass of particles to be coated and to spray dry the agitated mass with the desired quantity of silicate solution. The thickness of the coating produced is then regulated by the quantity of solution added. It is possible to accomplish substantially the same result, in the laboratory, for example, by dipping a stirring rod into a silicate solution and then stirring the particles to be coated, repeating this operation until a coating of the desired properties is obtained. This can be accomplished on a commercial scale by the use of rakes or agitators, mounted on an endless belt, which are first dipped into a silicate solution and then passed through a mass of particles to be coated. It is possible, within the present invention, to limit the quantity of silicate in contact with the particles to be coated either by the use of a dilute silicate solution or by the use of an inert, non-aqueous solvent, such as alcohol or benzene, having a silicate solution dispersed therein. Another method of accomplishing this result is to agitate the particles to be coated in admixture with particles or pieces of a silicate gel. Silicic acid gels containing about 10 per cent solids have been found suitable, for example.

When the particles are treated with a solution of an alkali metal silicate to produce the desired gel coating, this may be accomplished advantageously by first making a slurry by mixing the particles with water and then mixing in the silicate solution. It is advantageous to add the silicate slowly to the slurry. Then a "soaking" period of from 3 to 60 minutes, for example, may be allowed for formation of the coating before the silicate is rendered inactive by removal or drying. The longer this soaking period the thicker the coating and the less the reactivity of the coated particles. It is possible to repeat the coating operation if it is desired to obtain particles having a very slow rate of reaction. The coated particles can be removed from the silicate coating solution by filtration or centrifugal force, for example, followed by drying or the slurry can be dried directly by passing it in contact with the heated surface of a flaking drum or by dispersing it in heated air or by any other method of flash evaporation. It is also possible to coat the particles by spraying them with a silicate solution while dispersed in a stream of heated air or while suspended in the basket of a centrifuge, for example. By these methods the time afforded for any reaction to take place, between the silicate solution and the particles to be coated, can be reduced to almost any desired extent.

In a modification of my invention it is possible to form a pre-mixed cement or other product by admixing a reactive metal compound with a slowly-soluble, dry alkali metal silicate having a rate of solution such that, upon the addition of water to the mixture, the particles will first become coated with a gel coating followed eventually by complete reaction and the formation of an insoluble product upon the further solution of the silicate. Silicates having a rate of solubility corresponding substantially to that of gypsum are useful for this purpose.

The gel coatings of my invention can be produced in aqueous solutions of alkali metal silicates ranging in concentration from about 2 to 90 per cent by weight and having ratios of $Na_2O$ to $SiO_2$ ranging from about 1:4 to 1:1; these values differing to some extent with the temperature and time of treatment. These coatings may be formed either in the cold or by heating the silicate solutions. Their formation is accelerated by heating. When dilute silicate solutions are used, optimum results are obtained, in the coating of chemical compounds having a reactivity about the same as anhydrite, for example, by heating the particles to be coated with the silicate at a temperature ranging from about 20° to 90° C. for about 1 to 30 minutes, the shorter treating periods being employed with the higher temperatures and the more concentrated solutions.

The gel coating formed on the particles by the methods described can be identified readily by treating the gel coated particles with solutions of dyes such as methylene blue, safranine, crystal violet and malachite green. The gel coating exhibits a preferential absorption for the dye and can be distinguished easily under the miscroscope from the cores of the material coated which, if crystalline, exhibit the phenomenon of birefringence when viewed between crossed Nichol prisms. Uncoated particles in contrast are not colored by these dyes to any appreciable extent. The coated particles can also be distinguished from the uncoated particles by the fact that they tend to roll in lumps while untreated particles flow smoothly, like sand. The coated product also contains many aggregates formed by agglomeration of the particles during the coating treatment. Furthermore the treated particles of the present invention have an apparent specific gravity substantially below that of untreated particles of similar dimensions. For example while untreated anhydrite has an apparent specific gravity of about 0.92, the treated anhydrite particles have a gravity falling within the limits of about 0.45 and 0.55.

One particular advantage of the present invention is that it enables the production of a series of acid proof cements, stuccos, adhesives, etc., of neutral reaction. Thus, if the material to be coated is a metal compound and if the quantity of this compound in the cement, for example, is made at least equivalent to the alkali metal oxide present in the silicate, the final set product will have a neutral reaction. This is evident from the following equation of reaction, in which MeX represents a metal compound having bivalent acid and basic radicals with which a sodium silicate is reacted:

$$Na_2O \cdot XSiO_2 + MeX = Na_2X + MeO \cdot XSiO_2 \text{ (insoluble)}$$

MeX in the above equation may represent anhydrite ($CaSO_4$) or copper sulfate, for example. The production of this result was not possible prior to the present invention for the reason that the uncoated metal compounds, reactive with silicate solutions to form binding agents, are too quickly reactive to be suitable for the production of acid proof cements or adhesives, etc. But with the gel coated particles of the present invention suitable setting compositions can be produced which remain fluid and workable for periods of several hours.

It has long been desired to produce acid proof cements and silicate adhesives of neutral reaction for the reason that in many applications of these products the alkali which has been present in prior art products has been disadvantageous. An example of this is in the production of compound fibreboard with silicate adhesives. The alkali of the prior art adhesives has been found disadvantageous in many cases for the reason that it attacks any resinous sizing agents which may be present in the paper, as well as discoloring many dyestuffs and causing efflorescence. In some cases it has been necessary to employ special expedients to prevent the penetration of the alkali from the silicate adhesives commonly used in the production of compound fibreboard. The present invention enables the production of an adhesive which sets by internal chemical reaction, forming an insoluble and water-resistant residue, rather than setting slowly by external drying with the formation of a hard layer enclosing an interior which remains soft for a considerable time interval. By the use of this adhesive, combined fibreboard may be made, in which the danger of injury by alkali is minimized.

As indicated by the above equation, the metal compounds which are useful in the present invention are those which are capable of producing insoluble precipitates with silicate solutions. It appears probable that, during the coating operation, this same chemical reaction takes place but only with the surface layers of the particles which are coated. If this is correct, the resulting gelatinous precipitate which is formed as a coating on the particles then serves as a protecting layer producing the desired delayed rate of reaction. The coatings are undoubtedly in the form of gels since this can be proved by conventional tests. When the coated particles are dried in the presence of the coating solution, the outer layers of the gel coatings undoubtedly consist to at least some extent of the partially dehydrated silicate. This is indicated by the fact that, the more soluble the silicate used to produce the coating, i. e. the higher the ratio of alkali metal oxide to silica, the more highly reactive the coated particles.

In the production of silicate setting compositions, such as cements, adhesives, stuccos, plasters and the like, the coated particles of the present invention are employed as the component which is reactive with the silicate. In the making of a cement, for example, the coated particles may be mixed with a silicate solution and with any desired inert filler or aggregate to produce a mortar. The coated particles produce a substantial delay in the set of the mortar and thus provide sufficient time for application and working. The final set cement has a strength which is usually substantially greater than that produced with the present silicate cements. Thus, it is possible to produce set products with the use of this invention having tensile strengths of over 200 pounds. It is possible to employ in the making of such products many compounds which, if uncoated, would be quite worthless owing to their speed of reaction. This invention thus greatly extends the range of chemical compounds with which chemically setting silicate cements and other products can be produced. And it should be noted that the coating treatment introduces no extraneous chemicals or impurities into the set products. Compositions of widely different character which are suitable for many special uses may be produced, among which there may be mentioned chemically setting paint compositions, cements suitable for coating welding rods, for making abrasive sheets, for joining sewer pipes, for setting tile, for metal coating in the lining of pipe, tanks etc., setting compositions useful in the making of plaster board, in the making of cast blocks and monolithic construction, in the consolidation of porous strata in the drilling of oil wells etc.

Among the chemical compounds which have been successfully coated by my method there may be mentioned anhydrite, lead oxide (PbO), ferric sulfate, calcium chloride, calcium sulfate, hydrated lime, magnesium chloride, aluminum sulfate, and copper sulfate. Calcium and magnesium compounds are the most important commercially since they form highly insoluble silicates upon reaction with silicate solutions and these are excellent binders. My tests with these materials show that all solid chemical compounds which have the property of reacting with silicate solutions with the formation of insoluble gelatinous reaction products can be gel coated by suitable modification of the procedures which have been described and with the production of coated particles having rates of reaction which are substantially lower than those of similar particles which are uncoated.

My invention can be explained in more detail by reference to the following specific examples which illustrate certain compositions within the purview of my invention and with which favorable results have been obtained in actual practice.

Example 1

I moistened with water 5 parts of anhydrite, which had been ground to such fineness that about 90 per cent passed a 200 mesh screen, and then mixed this into a dilute silicate of soda solution heated to a temperature of about 85° C. This dilute silicate of soda solution was formed by taking 10 parts of a silicate of soda having a density of 41° Baumé, with a ratio of $Na_2O$ to $SiO_2$ of 1 to 3.22, and mixing it with 90 parts of water. Heating and stirring of the mixture were continued for about 1 minute. Then, after settling for a minute or two, the bulk of the supernatant liquid was poured off and the treated anhydrite was recovered by filtering off the remaining liquor. The anhydrite, while still in the moist condition, was then mixed with 10 parts of the same 41° Baumé silicate. This mixture was found to set within about 15 minutes to a solid mass having considerable crushing strength. The properties of this composition adapt it for use as a cement where great quickness of set is desired.

Example 2

I took 3 parts of anhydrite, ground to about 200 mesh and treated it, at room temperature, for 30 minutes with 100 parts of a 10 per cent solution of sodium silicate of 59° Baumé gravity and $1Na_2O$ to $2SiO_2$ ratio. The solid matter was separated from the bulk of the liquid by filtration. I then mixed 2 parts of the damp solids with 10 parts of sodium silicate of 41° Baumé gravity and $1Na_2O$ to $3.22 SiO_2$ ratio, and with 3 parts of a finely ground hydrous clay. The composition formed in this manner was found suitable for use as an adhesive. It remains sufficiently liquid to be pumped and successfully applied for several hours.

Example 3

50 parts of 10 to 20 mesh $CuSO_4.5H_2O$ were quickly stirred into 100 parts of a 10 per cent solution of a sodium silicate having a gravity of 41.1° Bé. and containing 6.85 per cent of $Na_2O$ and 28.5 of $SiO_2$ (usually called "N" brand silicate). The resulting suspension was immediately filtered, followed by drying for 12 hours at a temperature somewhat above room temperature. The final gel coated product was loose and dry with a blue chalky coating covering the particles, unaltered copper sulfate being present in their interior. The yield was 40 parts of the gel coated product. When 5 parts of this product were then mixed with 20 parts of a 50 per cent solution of the same sodium silicate, the mixture was found to form a solid gel within a period of 15 minutes. Uncoated particles of the same copper sulfate formed a gel with the same silicate solution in a substantially shorter time interval.

Example 4

Granular calcium chloride was gel coated by stirring with an agitator which was repeatedly dipped into "N" brand silicate and then used to stir the granular calcium chloride. This operation was continued until the grains balled up somewhat and the mixture became damp. The resulting product was dried at 105° C. for 3 hours. No melting took place at these temperatures. The dry product was then reacted with a 50 per cent solution of "S" brand silicate (33.5° Bé. and containing 6.4 per cent of $Na_2O$ and 24.7 per cent of $SiO_2$) and it was found that setting took place only after about 5 minutes, whereas uncoated granular calcium chloride produced setting with this silicate solution almost immediately.

Example 5

Ferric sulfate in the form of rounded pellets was coated with the use of an agitator which was repeatedly dipped into "N" brand silicate. This operation was continued until the pellets tended to stick together somewhat and became coated with a brown coating while remaining a lighter color at their cores. After these pellets were dried at 105° C. they were stirred into a 50 per cent solution of "S" brand silicate and the mixture was found to set in about 18 minutes. Uncoated pellets produced a similar set in about half of this time.

Example 6

Magnesium chloride in flake form was crushed into small particles. These particles were stirred with an agitator which was repeatedly dipped into "N" brand silicate until the mass became quite damp, after which it was dried at 105° C. The dried mass was again treated by the same procedure, dried, and then treated for the third time and finally dried. The resulting particles, with their triple coating, were then mixed with "N" brand silicate solution and setting was found to take place only after 26 minutes. The untreated particles were found to produce a set with the same silicate solution within a few seconds.

Example 7

Granular aluminum sulfate was coated by mixing with a 50 per cent solution of "N" brand silicate, the solution being decanted from the coated granules after a contact of about 30 seconds. The coated granules were then dried. It was found that these coated granules, when subsequently mixed with a 50 per cent solution of "N" brand silicate, caused setting of the mixture to take place within a period of about an hour. Uncoated aluminum sulfate granules mixed with the same solution produced a set within about 5 seconds.

The sodium silicate solutions employed in the above examples can be replaced by potassium or other alkali metal silicates. It is evident from the properties of the compositions obtained in these examples, that the setting time can be closely controlled by the time and conditions of treatment.

The gel coated particles of the above specific examples can be mixed in various proportions with any of the known silicate cements. Compositions having widely differing properties result. Any excess of the coated particles above that required to react with the silicate added serves as an inert solid and can be used to replace part or all of the clays which are used in many silicate compositions. When aggregates are employed in the setting compositions, the metal silicate which is formed by the chemical reaction during setting serves as a binder. When pretreated anhydrite, for example, is mixed with a small quantity of a concentrated silicate solution, the resulting composition has many of the properties of plaster of Paris mixed with water and it can be used for the same purposes. It can be molded and cast, a sharp reproduction of all details of the mold structure being obtained.

When the coated particles of my invention are to be mixed with a sodium silicate solution for the production of setting compositions, the ratio of the Na₂O to the SiO₂ in the silicate solution employed can be varied between about 1:4 to 1:1.58.

It has been found that the gel coating on the particles of this invention delay the rate of reaction of these particles with all types of reactants. The gel coating is, of course, rather slowly soluble in water and it is porous, which is seen from the fact that hygroscopic compounds, when gel coated, absorb water from the air almost as rapidly as uncoated particles. In certain cases the gel coating reacts with the added chemical reactant before the cores of the particles are exposed to the reactive medium while in other cases the gel coating dissolves without taking part in the reaction.

While I have described what I consider to be the more advantageous embodiments of my invention, it is obvious, of course, that many modifications can be made in the products and specific procedures which have been discussed. Various addition agents can be employed in my compositions, for example. An addition of zinc oxide usually increases the water resistance of my cements. Pigments, inert solids and compatible fillers of all types may be added. In fact any of the additions which have been suggested in connection with prior art silicate compositions are useful in the present invention. The size of the particles which are gel coated in accordance with this invention may vary from about 200 mesh up to the size of a pea or larger. Further modifications which fall within the scope of the following claims will be immediately evident to those skilled in this art.

What I claim is:

1. The process of making chemically setting silicate compositions of the nature of mortars, cements, adhesives, plasters, stuccos and the like, which comprises mixing together an aqueous solution of an alkali metal silicate with a finely powdered reactive material selected from a group consisting of compounds of the alkaline earth and heavy metals, having the property of reacting with alkali metal silicate solutions with the production of insoluble gelatinous reaction products, arresting the resulting chemical reaction before the particles of said material have completely reacted with said silicate solution but after the formation on said particles of a siliceous gel coating, and thereafter mixing the gel-coated particles with a strong aqueous solution of an alkali metal silicate to form a setting composition having a time of set which is substantially longer than that obtained in the absence of said gel coating.

2. The process of making chemically setting silicate compositions of the nature of mortars, cements, adhesives, plasters, stuccos and the like, which comprises mixing together a finely powdered reactive material, selected from a group consisting of compounds of the alkaline earth and heavy metals, having the property of reacting with alkali metal silicate solutions with the production of insoluble gelatinous reaction products, and an aqueous solution of an alkali metal silicate containing insufficient silicate to completely react with the particles of said material but sufficient to form on the individual particles a siliceous gel coating, then drying the mass, and mixing the resulting gel coated particles with a strong aqueous solution of an alkali metal silicate to form a setting composition having a time of set which is substantially longer than that produced in the absence of said gel coating.

3. The process of making chemically setting silicate compositions of the nature of mortars, cements, adhesives, plasters, stuccos and the like, which comprises mixing together a finely divided reactive powder, comprising a compound selected from the group consisting of the alkaline earth and heavy metal compounds, having the property of reacting with alkali metal silicate solutions with the formation of insoluble gelatinous reaction products, and an excess of a diluted aqueous solution of an alkali metal silicate and separating said reactive powder from said solution prior to complete reaction of the particles of said powder with said solution but after the formation on said particles of a siliceous gel coating, and thereafter mixing with said gel coated particles a concentrated aqueous solution of an alkali metal silicate to form a setting composition having a time of set which is substantially longer than that produced in the absence of said gel coating.

4. The process of making chemically setting silicate compositions of the nature of mortars, cements, adhesives, plasters, stuccos and the like, which comprises mixing together a finely divided reactive powder, comprising a compound selected from the group consisting of the alkaline earth and heavy metal compounds, having the property of reacting with alkali metal silicate solutions with the formation of insoluble gelatinous reaction products, and an aqueous solution of an alkali metal silicate, quickly drying the mixture before the complete reaction of the particles of said powder with said silicate solution but after the formation on said particles of a siliceous gel coating, then mixing the gel coated particles with a strong solution of an alkali metal silicate to form a setting composition having a time of set which is substantially longer than that produced in the absence of said gel coating.

5. The process of claim 1 wherein said reactive material consists of lead oxide.

6. The process of claim 1 wherein said reactive material consists of a calcium compound.

7. The process of claim 1 wherein said reactive material consists of a magnesium compound.

8. The process of claim 1 wherein said aqueous solution is a solution of sodium silicate having a ratio of Na₂O to SiO₂ ranging from about 1:1 to 1:4.

9. Fluid compositions capable of setting to form cements, adhesives, plasters, stuccos and the like, which comprise a mixture of a strong solution of an alkali metal silicate admixed with a finely powdered reactive material, selected from a group consisting of compounds of the alkaline earth and heavy metals, having the property of reacting with solutions of alkali metal silicates with the formation of insoluble gelatinous reaction products, the particles of said reactive material being covered individually with a superficial, siliceous gel coating having a preferential absorption for dyes, said gel coated particles, when dry, having a specific gravity substantially below that of similar uncoated particles and tending to roll in lumps; said composition having a time of set which is substantially longer than that of a similar composition in which said particles are free from said gel coating.

JOHN D. CARTER.